(12) United States Patent
Jang et al.

(10) Patent No.: US 8,658,294 B2
(45) Date of Patent: Feb. 25, 2014

(54) PROTECTIVE CIRCUIT MODULE AND SECONDARY BATTERY HAVING THE SAME

(75) Inventors: Youngcheol Jang, Yongin-si (KR); Eunok Kwak, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 600 days.

(21) Appl. No.: 12/577,607

(22) Filed: Oct. 12, 2009

(65) Prior Publication Data

US 2010/0092805 A1    Apr. 15, 2010

(30) Foreign Application Priority Data

Oct. 15, 2008   (KR) .................. 10-2008-0101240

(51) Int. Cl.
  *H01M 10/48* (2006.01)
  *H01M 2/34* (2006.01)
  *H01M 2/22* (2006.01)

(52) U.S. Cl.
  USPC ............. 429/7; 429/61; 429/92; 429/99

(58) Field of Classification Search
  USPC .............................. 429/7, 90–936
  See application file for complete search history.

(56) References Cited

U.S. PATENT DOCUMENTS

| | | | |
|---|---|---|---|
| 6,724,170 B1 * | 4/2004 | Maggert et al. | 320/107 |
| 2002/0018932 A1 * | 2/2002 | Chikada | 429/185 |
| 2004/0115519 A1 | 6/2004 | Lee | |
| 2005/0271934 A1 * | 12/2005 | Kiger et al. | 429/159 |
| 2007/0202364 A1 * | 8/2007 | Uh et al. | 429/7 |

FOREIGN PATENT DOCUMENTS

| | | | |
|---|---|---|---|
| JP | 09320554 A | * | 12/1997 |
| JP | 2000-208118 | | 7/2000 |
| JP | 2001-313016 | | 11/2001 |
| JP | 2006-040775 | | 2/2006 |
| KR | 1020020070653 A | | 9/2002 |
| KR | 1020040086796 A | | 10/2004 |

OTHER PUBLICATIONS

Machine translation of JP 09-320554 (Awata).*
English Machine Translation of JP2000-208118.
English Machine Translation of JP2001-313016.
English Machine Translation of JP2006-040775.
Korean Notice of Allowance dated Nov. 10, 2010 issued by the KIPO for Priority Korean Patent Application No. 10-2008-0101240, 5 pages.

* cited by examiner

*Primary Examiner* — Raymond Alejandro
*Assistant Examiner* — Helen McDermott
(74) *Attorney, Agent, or Firm* — Christie, Parker & Hale, LLP

(57) ABSTRACT

A protection module capable of being utilized by a secondary battery regardless of the external mounting structure of the secondary battery for mounting the secondary battery to an external device. Accordingly, it is unnecessary to separately manufacture a protective circuit module according to the external mounting structure of the battery. The secondary battery includes: a plurality of bare cells each of which includes a can, an electrode assembly, and a cap assembly; a first protective circuit module located on the upper surface of the bare cells that is formed by the cap assemblies; and a secondary protective circuit module located on a side surface of the bare cells that is formed by curved surfaces of the cans. The first protective circuit module and the second protective circuit module are electrically connected to each other.

12 Claims, 5 Drawing Sheets

//  PROTECTIVE CIRCUIT MODULE AND SECONDARY BATTERY HAVING THE SAME

CROSS-REFERENCES TO RELATED APPLICATION

This application claims priority to and the benefit of Korean Patent Application No. 10-2008-0101240, filed on Oct. 15, 2008, in the Korean Intellectual Property Office, the entire content of which is incorporated herein by reference.

BACKGROUND OF THE INVENTION

1. Field of the Invention

The present invention relates to a battery and, more particularly, to a protective circuit module, and a secondary battery having the same.

2. Description of the Related Art

A lithium ion secondary battery includes a positive electrode plate, a negative electrode plate, an electrolyte, and a separator; and is capable of being repeatedly charged and discharged.

The lithium ion secondary battery includes a protective circuit module (PCM) for protecting the battery from overcharge, overdischarge, and overcurrent. A protective circuit and various suitable metal patterns may be mounted onto a substrate of the protective circuit module.

Secondary batteries may be classified as either width type secondary batteries or length type secondary batteries according to the structures in which they are mounted to the external electronic devices, such as mobile phones.

Typically, protective circuit modules are formed with bare cells at different positions according to whether the types of secondary batteries are of a width type or a length type.

Accordingly, protective circuit modules need to be manufactured according to the types of secondary batteries, thereby increasing the number of manufacturing processes and manufacturing costs.

BRIEF SUMMARY OF THE INVENTION

Aspects of embodiments of the present invention are directed toward a protective circuit module that can be utilized regardless of the external mounting structure of a secondary battery, and a secondary battery having the same.

An embodiment of the present invention provides a secondary battery including: a plurality of bare cells each of which includes a can, an electrode assembly, and a cap assembly; a first protective circuit module located on an upper (or first) surface of the bare cells that is formed by the cap assemblies; and a secondary protective circuit module located on a side (or second) surface of the bare cells, the first protective circuit module and the second protective circuit module being electrically connected to each other.

The first protective circuit module and the second protective circuit module may be electrically connected to each other through a connector.

The connector may be a flexible printed circuit board.

A plurality of first lead plates electrically connecting the cap assemblies to the first protective circuit module may be located at a side of the first protective circuit module.

The bare cells may include electrode terminals located on the upper surface thereof, and a plurality of second lead plates electrically connecting the electrode terminals to the first protective circuit module may be located on the lower surface of the first protective circuit module.

Each of the first protective circuit module and the second protective circuit module may include a charge/discharge terminal and a printed circuit board having a conductive metal pattern.

At least one of the first protective circuit module or the second protective circuit module may include a protective circuit.

The bare cells may include a first bare cell and a second bare cell, and the protective circuit included in the second protective circuit module may be located on the lower surface of the printed circuit board at a region where the first bare cell and the second bare cell make contact with each other.

A cover case may be at upper portions of the first protective circuit module and the second protective circuit module, the cover case having a first terminal hole corresponding to the charge/discharge terminal of the first circuit module and a second terminal hole corresponding to the charge/discharge terminal of the second protective circuit module.

A cover may be attached to the first terminal hole or the second terminal hole. That is, the cover may be attached to one of the terminal holes.

The second protective circuit module may further include a holder fixing the second protective circuit module to the bare cells.

Also, in accordance with another embodiment of the present invention, there is provided a protective circuit module electrically connected to a plurality of bare cells each of which includes a can, an electrode assembly, and a cap assembly, the protective circuit module including: a first protective circuit module located on an upper (or first) surface of the bare cells that is formed by the cap assemblies; and a second protective circuit module located on a side (or second) surface of the bare cells that is formed by a curved surface of the can of each of the bare cells, the first protective circuit module and the second protective circuit module being electrically connected to each other.

Each of the first protective circuit module and the second protective circuit module may include a charge/discharge terminal and a printed circuit board having a conductive metal pattern, and at least one of the first protective circuit module or the second protective circuit module includes a protective circuit.

The bare cells may include a first bare cell and a second bare cell, and the protective circuit included in the second protective circuit module may be located on the lower surface of the printed circuit board at a region where the first bare cell and the second bare cell make contact with each other.

Also, in accordance with yet another embodiment of the present invention, there is provided a secondary battery. The secondary batter includes: a plurality of bare cells and a protect circuit module. Here, each of the bare cells includes a can, an electrode assembly, and a cap assembly. The plurality of bare cells has a first surface facing toward a first direction (e.g., an upper surface) and a second surface facing toward a second direction perpendicular to the first direction (e.g., a side surface), the first surface is formed by the cap assemblies, and the second surface is formed by curved surfaces of the cans. The protective circuit module includes a first protective circuit module on the first surface and a secondary protective circuit module on the second surface, and the first protective circuit module and the second protective circuit module are electrically connected to each other.

In one embodiment, each of the first protective circuit module and the second protective circuit module includes a charge/discharge terminal and a printed circuit board having a conductive metal pattern, and at least one of the first protective circuit module or the second protective circuit module includes a protective circuit. The bare cells may include a first bare cell and a second bare cell, the protective circuit may be included in the second protective circuit module and on a surface of the printed circuit board facing the bare cells and at a region where the first bare cell and the second bare cell make contact with each other.

In view of the above and according to an embodiment of the present invention, a protection circuit module that can be utilized by both a width type secondary battery and a length type secondary battery is mounted to the bare cells, thereby simplifying the process for manufacturing a protective circuit module and reducing manufacturing costs.

In addition, according to an embodiment of the present invention, the extra space needed for including a protective circuit formed in a protective circuit module can be reduced (or eliminated), thereby miniaturizing a secondary battery.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
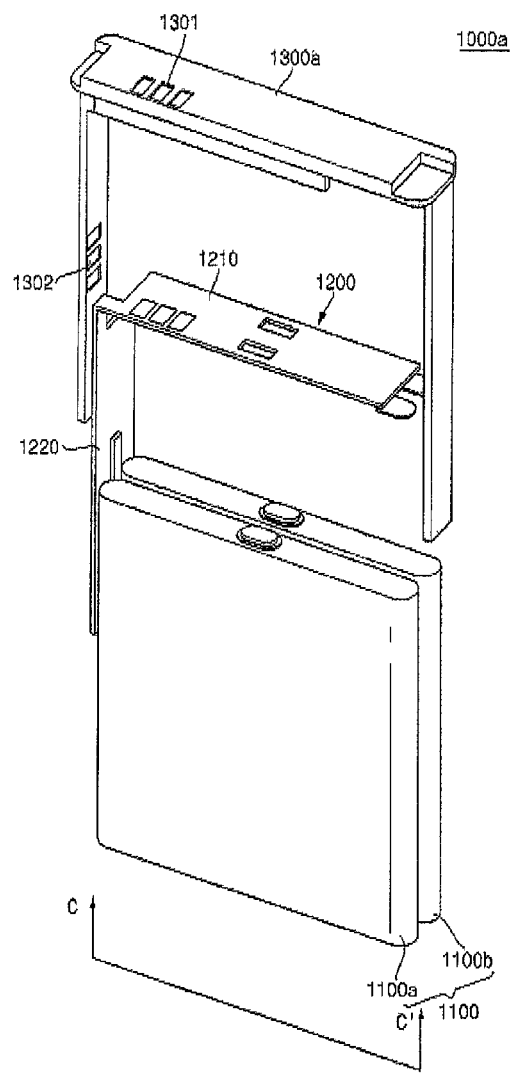
FIG. 1 is a schematic perspective view of a width type secondary battery according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Hereinafter, protective circuit modules and secondary batteries according to various embodiments of the present invention will be described in more detail with reference to the accompanying drawings. It should be understood that the secondary batteries described hereinafter may be lithium secondary batteries or other suitable secondary batteries equivalent to the lithium secondary batteries.

Figure 2:
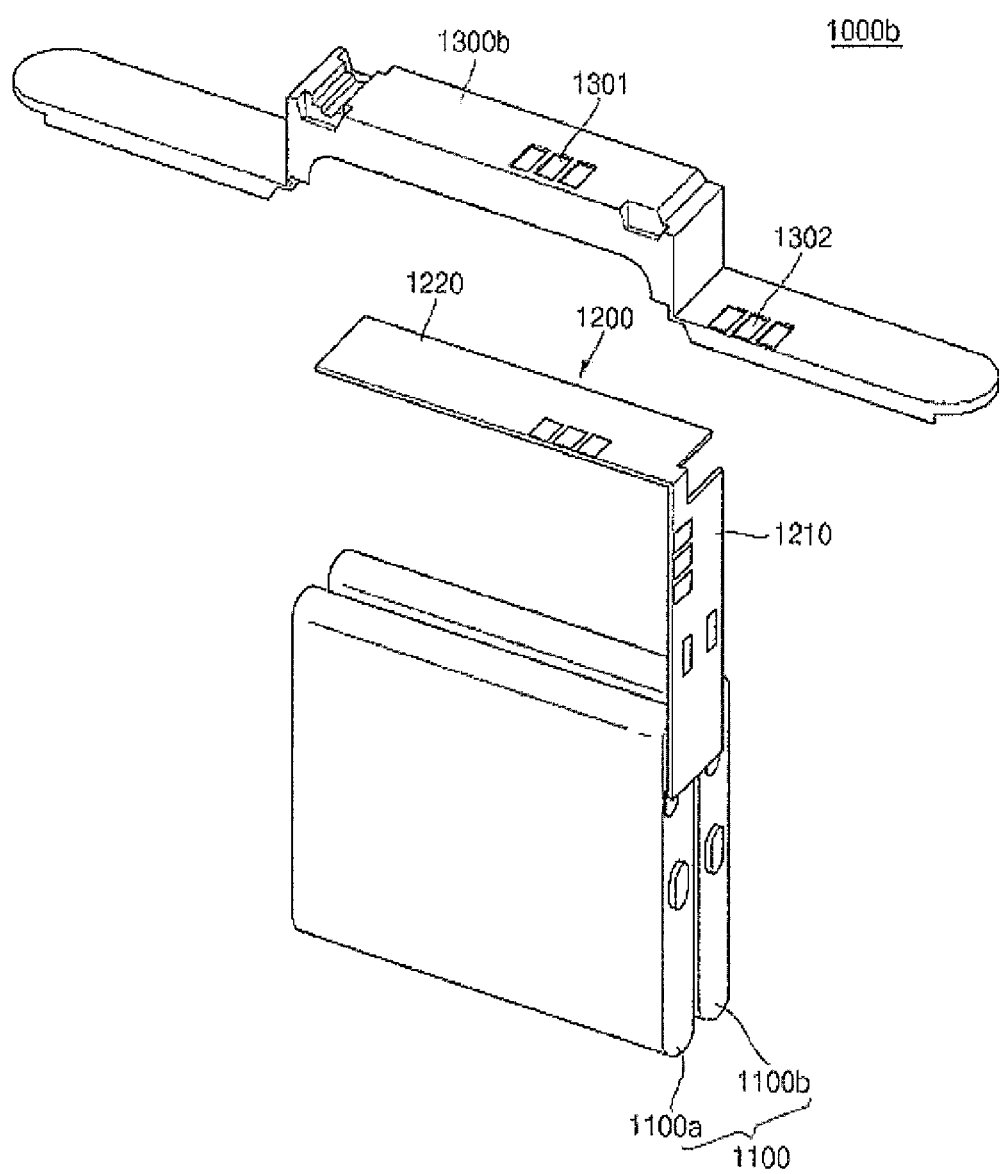
FIG. 2 is a schematic perspective view of a length type secondary battery according to an embodiment of the present invention.
Figure 3:
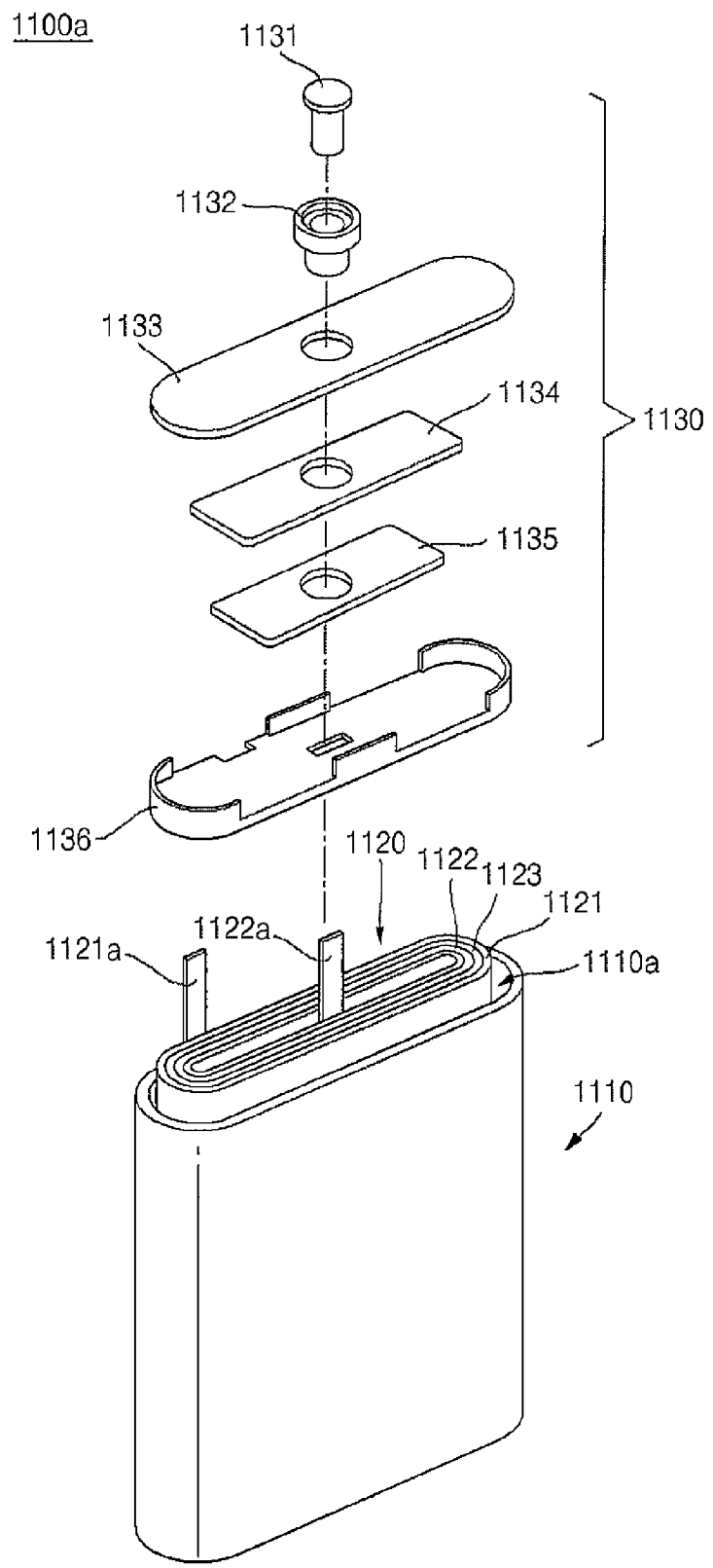
FIG. 3 is a schematic exploded perspective view of a bare cell according to an embodiment of the present invention.
Figure 4:
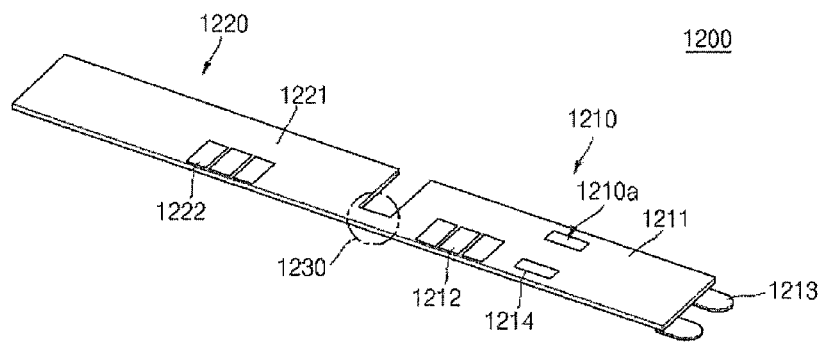
FIG. 4 is a schematic top (or plan) view of a protective circuit module according to an embodiment of the present invention.
Figure 5:
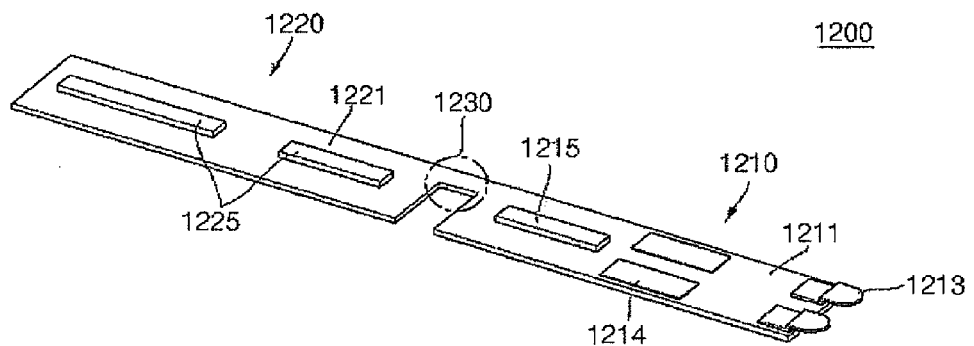
FIG. 5 is a schematic bottom view of the protective circuit module of FIG. 4.

FIG. 1 is a schematic perspective view of a width type secondary battery 1000a according to an embodiment of the present invention. FIG. 2 is a schematic perspective view of a length type secondary battery 1000b according to an embodiment of the present invention. FIG. 3 is a schematic exploded perspective view of a bare cell 1100 according to an embodiment of the present invention. FIGS. 4 and 5 are plan and bottom views of a protective circuit module 1200 according to an embodiment of the present invention.

Referring to FIGS. 1 to 5, the secondary battery 1000a, 1000b includes a plurality of bare cells 1100, a protective module 1200 located on the bare cells 1100, and a cover case 1300a, 1300b located on the protective circuit module 1200. In the protective circuit module 1200, a first protective circuit module 1210 and a second protective circuit module 1220 located on side surfaces of the bare cells 1100 are connected to each other. This structure will be described below in more detail.

The bare cells include a first bare cell 1100a and a second bare cell 1100b disposed with each other in parallel. In FIGS. 1 and 2, two bare cells 1100 electrically connected in parallel are illustrated. However, it should be understood that the number of bare cells 1100 can be more than 2, and the bare cells 1100 can be electrically connected in parallel or in series. In the following descriptions, the term "bare cells" refers to a plurality of bare cells.

The first bare cell 1100a includes a can 1110, an electrode assembly 1120, and a cap assembly 1130. The electrode assembly 1120 is contained in the can 1110 through an opening 1110a formed on one side of the can 1110, and the opening 1110a is sealed by the cap assembly 1130. The first bare cell 1100a has a positive electrode and a negative electrode and may be the minimum unit of the secondary battery 1000 that can perform charging and discharging operations.

The can 1110 is substantially a rectangular parallelepiped (or has a prismatic shape) and has the opening 1110a on one side of the can 1110. The can 1110 may be made of a light metal material such as aluminum (Al) and may function as a terminal by itself. The electrode assembly 1120 and the electrolyte are received by (and contained in) the can 1110 through the opening 1110a.

The electrode assembly 1120 includes a first electrode plate 1121, a second electrode plate 1122, and a separator 1123. In the electrode assembly 1120, the separator 1123 is located between the first electrode plate 1121 and the second electrode plate 1122. The electrode assembly 1120 is wound into a jelly-roll type configuration.

A first electrode tab 1121a and a second electrode tab 1122a are attached to the first electrode plate 1121 and the second electrode plate 1122, respectively, and protrude toward (and/or extend out of) the opening 1110a of the can 1110.

In the secondary battery 1000, the can 1110 functioning as a terminal may be a positive electrode. Then, in the case of the first electrode plate 1121 being a positive electrode, the outermost electrode plate of the jelly-roll type electrode assembly 1120 may be the positive electrode, i.e. the first electrode plate 1121. By contrast, in the case of the first electrode plate 1121 being a negative electrode, the outermost electrode plate of the jelly-roll type electrode assembly 1120 may be the positive electrode, i.e. the second electrode plate 1122.

In one embodiment, during the charging operation of the electrode assembly 1120, lithium ions move from the first electrode plate 1121 to the second electrode plate 1122 to be intercalated thereby; and, during the discharging operation of the electrode assembly 1120, lithium ions are deintercalated from the second electrode plate 1122 to the first electrode plate 1121 to apply a voltage to an external power source.

In the following descriptions, it is assumed that the first electrode plate 1121 is a positive electrode and the second electrode plate 1122 is a negative electrode.

The cap assembly 1130 includes an electrode terminal 1131, a gasket 1132, a cap plate 1133, an insulation plate 1134, and a terminal plate 1135. The cap assembly 1130 is coupled to the electrode assembly 1120 together with a separate insulation case 1136 at the opening 1110*a* of the can 1110 in order to seal the can 1110.

The electrode terminal 1131 is inserted through the gasket 1132, the cap plate 1133, the insulation plate 1134, and the terminal plate 1135 to be electrically connected to the second electrode tab 1122*a* of the electrode assembly 1120. The first electrode tab 1121*a* is electrically connected to one side of the cap plate 1133 corresponding thereto. The electrode terminal 1131 may be a negative terminal.

The protective circuit module 1200 includes a first protective circuit module 1210, a second protective circuit module 1220, and a connector 1230. The protective circuit module 1200 protects the secondary battery (1000*a*) from overcharge and overcurrent and reduces (or prevents) lowering of performance due to overdischarge.

The first protective circuit module 1210 includes a first printed circuit board 1211, a first charge/discharge terminal 1212, a first protective circuit 1215, a first lead plate 1213, and a second lead plate 1214. Here, it should be understood that the first lead plate 1213 and the second lead plate 1214 are not the elements of the first protective circuit module 1210, but may be composed of devices included in the protective circuit module 1200.

The first protective circuit module 1210 is located on a first surface (e.g., an upper surface) of the bare cell 1100 including the cap assembly 1130 and is electrically connected to the bare cell 1100 through the lead plates 1213 and 1214.

A conductive metal pattern is formed in the first printed circuit board 1211, and a plurality of first printed circuit boards may be stacked. The first printed circuit board 1211 may be made of epoxy and/or Bakelite.

The first charge/discharge terminal 1212 is electrically connected to the first protective circuit 1215, the second protective circuit 1225, and the conductive metal pattern to provide an electrical path with an external device.

The passive and active devices of the first protective circuit 1215 are electrically connected to the conductive metal pattern. The first protective circuit 1215 checks information about the charge/discharge of the battery, and the current, voltage, and temperature of the battery in order to protect the battery.

The first lead plate 1213 is soldered to a side of the protection circuit module 1200. The first lead plate 1213 electrically connects the cap assembly 1130 sealing the opening 1110*a* of the can 1110. That is, the first lead plate 1213 electrically connects the cap plate 1133 with the first protective circuit module 1210. Here, the cap plate 1133 and the first lead plate 1213 may be a positive terminal and a positive electrode plate respectively. The first lead plate 1213 may be welded to the cap plate 1133 through laser welding. The first lead plate 1213 may be made of a material selected from the group consisting of nickel (Ni), aluminum (Al), a nickel alloy, and an aluminum alloy.

The second lead plate 1214 is soldered to the lower surface of the first protective circuit module 1210 corresponding to the electrode terminal 1131 of the bare cell 1100. The second lead plate 1214 electrically connects the electrode terminals 1131 of the bare cells 1100*a* and 1100*b* protruding over the cap assembly 1130 through welding holes 1210*a* and the first protective circuit module 1210. Here, the electrode terminal 1131 and the second lead plate 1214 may be a negative electrode and a negative electrode lead plate respectively. The second lead plate 1214 may be made of a material selected from the group consisting of nickel (Ni), aluminum (Al), a nickel alloy, and an aluminum alloy.

The second protective circuit module 1220 includes a second printed circuit board 1221, a second charge/discharge terminal 1222, and a second protective circuit 1225.

The second protective circuit module 1220 is located on a second surface (e.g., a side surface) of the bare cell, i.e. a curved surface of the can. A holder connecting and fixing the second protective circuit module 1220 to the bare cell 1100 is mounted to the second protective circuit module 1220.

A conductive metal pattern is mounted to the second printed circuit board 1221, and a plurality of second printed circuit boards may be stacked. The second printed circuit board 1221 may be made of epoxy and/or Bakelite.

The second charge/discharge terminal 1222 is electrically connected to the second protective circuit 1225 and the conductive metal pattern to provide an electrical path with an external device.

The passive and active devices of the second protective circuit 1225 are electrically connected to the conductive metal pattern. The protective circuit checks information about the charge/discharge of the battery, and the current, voltage, and temperature of the battery in order to protect the battery.

Both the first protective circuit 1215 and the second protective circuit 1225 may be formed respectively on the first printed circuit board 1211 and the second printed circuit board 1221, or only one of the first protective circuit 1215 or the second protective circuit 1225 may be formed.

The first protective circuit module 1210 and the second protective circuit module 1220 are electrically connected to each other through the connector 1230. A conductive metal pattern electrically connecting the first protective circuit module 1210 and the second protective circuit module 1220 is mounted to the connector 1230. The size of the connector 1230 may be adjusted according to the amount of the conductive metal pattern. The connector 1230 includes a flexible printed circuit board so that the first protective circuit module 1210 and the second protective circuit module 1220 forms a specific angle.

All devices located on the first protective circuit module 1210 and the second protective circuit module 1220 may be electrically connected to each other through conductive metal patterns.

As mentioned above, the protective circuit module 1200 includes the first protective circuit module 1210 located on the bare cells 1100, the second protective circuit module 1220 located on a side of the bare cells 1100, and the connector 1230 electrically connecting the first protective circuit module 1210 and the second protective circuit module 1220. The first protective circuit module 1210 and the second protective circuit module 1220 are perpendicular to each other as the upper surface of the bare cells is perpendicular to the side surfaces of the bare cells 1100.

The cover case 1300*a*, 1300*b* is located at (or on) an upper portion of the protective circuit module 1200. The cover cases 1300*a* and 1300*b* have different structures according to whether the type of the battery is of a width type or a length type. In secondary batteries, classification of width type or length type batteries depends on how the batteries are mounted to external devices. The cover case 1300*a*, 1300*b* has a first terminal hole 1301 corresponding to the first charge/discharge terminal 1212 and a second terminal hole 1302 corresponding to the second charge/discharge terminal 1222.

Since the protective circuit module 1200 includes a plurality of charge/discharge terminals 1212 and 1222, when the secondary battery is mounted to an external device, one of the charge/discharge terminals 1212 and 1222 may be used according to the connection structure to the external device. Then, a cover is attached to one of the first terminal hole 1301 and the second terminal hole 1302 that is not in use. Accordingly, since the secondary battery includes a plurality of charge/discharge terminals and a plurality of terminal holes, the design ranges of the secondary battery and a product (external device) in which the secondary battery is used can be expanded.

In view of the foregoing, the protective circuit module 1200 according to an embodiment of the present invention can be used for both a width type secondary battery 1000a and a length type secondary battery 1000b. Accordingly, the manufacturing process of protective circuit modules 1200 suitable for a width type secondary battery 1000a and a length type secondary battery 1000b can be simplified, thereby reducing manufacturing costs.

In addition, as compared with a conventional protective circuit module formed by staking printed circuit boards to expand a mounting space of a conductive metal pattern, because the protective circuit module 1200 according to an embodiment of the present invention can have one printed circuit board, a space for mounting conductive metal patterns and devices included in a printed circuit board can be sufficiently secured. Accordingly, the protective circuit module can be slimmed, thereby slimming (or miniaturizing) the secondary battery.

Figure 6:
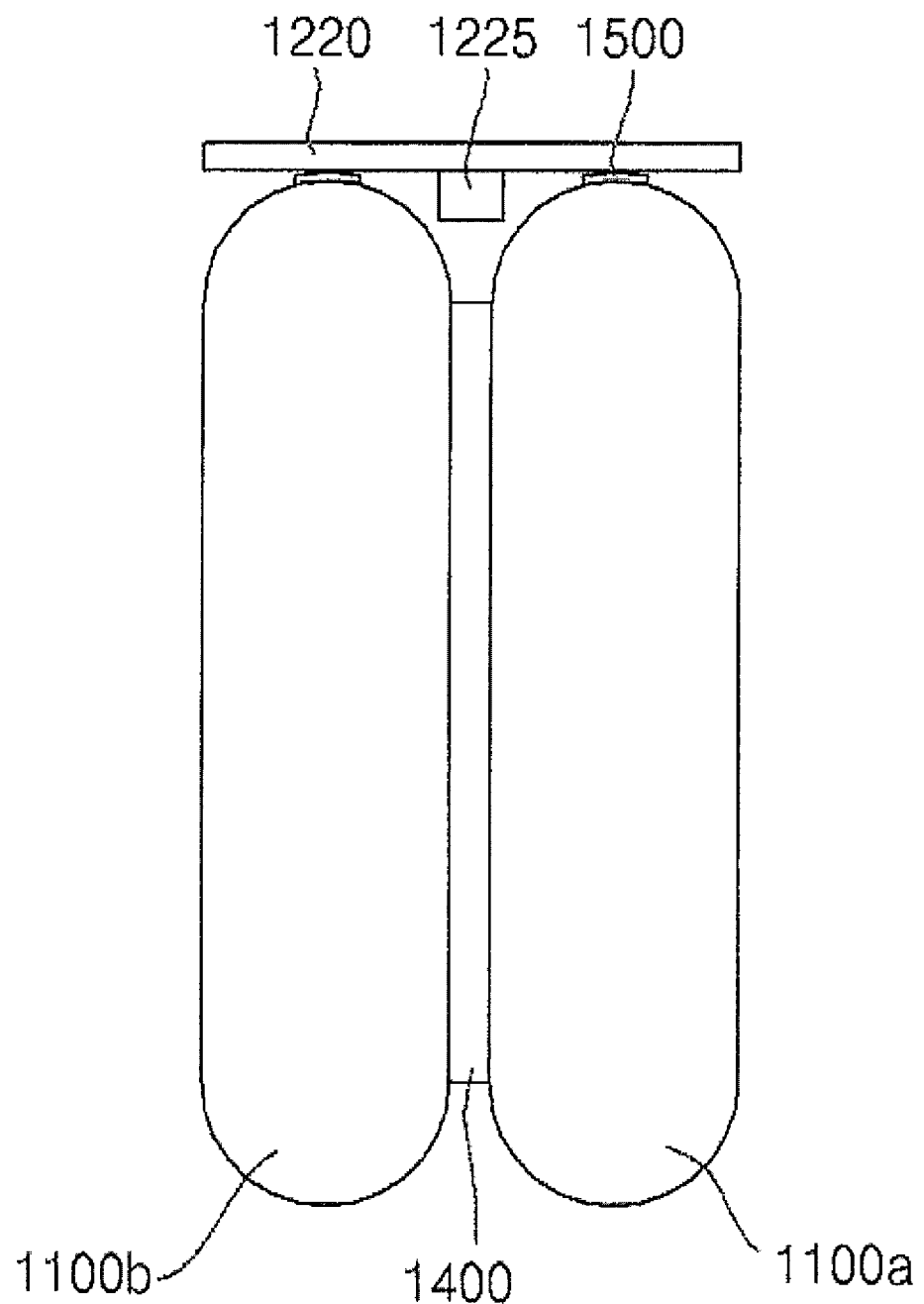
FIG. 6 is a schematic view of the width type secondary battery viewed from line C-C' of FIG. 1.

FIG. 6 is a schematic view of the width type secondary battery viewed from line C-C' of FIG. 1.

Referring to FIG. 6, the second protective circuit 1225 is located on the lower surface of the second printed circuit board 1221 at a position corresponding to a region where the first bare cell 1100a makes contact with the second bare cell 1100b. In FIG. 6, since insulation tapes 1400 and 1500 having specific thicknesses are illustrated between the first bare cell 1100a and the second bare cell 1100b and between the bare cells 1100 and the protective circuit module 1200, it can look like the first bare cell 1100a and the second bare cell 1100b, and the bare cells 1100 and the protective circuit module 1200 are spaced apart from each other by the thicknesses of the insulation tapes 1400 and 1500. However, the above-referenced illustration may be exaggerated. That is, in one embodiment, the thicknesses of the insulation tapes 1400 and 1500 is so thin that the first bare cell 1100a and the second bare cell 1100b, and the bare cells 1100 and the protective circuit module 1200 make contact with each other.

Here, the second protective circuit 1225 is located in an empty space defined by the first bare cell 1100a, the second bare cell 1100b, and the second printed circuit board 1221. As such and in view of the foregoing, the secondary battery according to an embodiment of the present invention may be made slimmer (or may be miniaturized) by eliminating the need for an extra space between bare cells and a printed circuit board needed to form a protective circuit device from the protective circuit modules for both a width type secondary battery and a length type secondary battery.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
a plurality of bare cells, each of the bare cells comprising a can, an electrode assembly, and a cap assembly, each of the bare cells having a first surface facing toward a first direction and a second surface facing toward a second direction perpendicular to the first direction, the first surface comprising the cap assembly and the second surface comprising a curved surface of the can,
wherein the first surfaces of all of the bare cells are aligned and in a first plane, and wherein the second surfaces of all of the bare cells are aligned and in a second plane perpendicular to the first plane;
a first protective circuit module on and physically contacting the first surface of each of the bare cells; and
a second protective circuit module on and physically contacting the second surface of each of the bare cells,
wherein each of the first protective circuit module and the second protective circuit module comprise a charge/discharge terminal and a printed circuit board having a conductive metal pattern,
wherein the first protective circuit module and the second protective circuit module are electrically connected to each other, and
wherein the second protective circuit module comprises a holder fixing the second protective circuit module to the bare cells.

2. The secondary battery of claim 1, wherein the first protective circuit module and the second protective circuit module are electrically connected to each other through a connector.

3. The secondary battery of claim 2, wherein the connector is a flexible printed circuit board.

4. The secondary battery of claim 1, further comprising a plurality of first lead plates at a side of the first protective circuit module, electrically connecting the cap assemblies to the first protective circuit module.

5. The secondary battery of claim 1, further comprising a plurality of second lead plates on a lower surface of the first protective circuit module,
wherein each of the bare cells comprises an electrode terminal on the first surface thereof, and
wherein the second lead plates electrically connect the electrode terminals to the first protective circuit module.

6. The secondary battery of claim 1, further comprising a cover case at upper portions of the first protective circuit module and the second protective circuit module, the cover case having a first terminal hole corresponding to the charge/discharge terminal of the first protective circuit module and a second terminal hole corresponding to the charge/discharge terminal of the second protective circuit module.

7. The secondary battery of claim 6, wherein a cover is attached to the first terminal hole or the second terminal hole.

8. The secondary battery of claim 1, wherein at least one of the first protective circuit module or the second protective circuit module comprises a protective circuit.

9. The secondary battery of claim 1, wherein the bare cells comprise a first bare cell and a second bare cell, and
wherein the second protective circuit module comprises a protective circuit, which is located on a printed circuit board at a region where the first bare cell and the second bare cell physically contact each other.

10. A protective circuit module electrically connected to a plurality of bare cells, each of the bare cells comprising a can, an electrode assembly, a cap assembly, a first surface comprising the cap assembly and facing toward a first direction, and a second surface comprising a curved surface of the can and facing toward a second direction perpendicular to the first direction, wherein the first surfaces of all of the bare cells are aligned and in a first plane, and wherein the second surfaces of all of the bare cells are aligned and in a second plane perpendicular to the first plane, the protective circuit module comprising:

a first protective circuit module on and physically contacting the first surface of each of the bare cells; and a second protective circuit module on and physically contacting the second surface of each of the bare cells, wherein each of the first protective circuit module and the second protective circuit module comprise a charge/discharge terminal and a printed circuit board having a conductive metal pattern, wherein the first protective circuit module and the second protective circuit module are electrically connected to each other, and wherein the second protective circuit module comprises a holder fixing the second protective circuit module to the bare cells.

11. The protective circuit of claim 10, wherein at least one of the first protective circuit module or the second protective circuit module comprises a protective circuit.

12. The protective circuit module of claim 10, wherein the bare cells comprise a first bare cell and a second bare cell, and wherein a protective circuit is included in the second protective circuit module on a lower surface of the printed circuit board at a region where the first bare cell and the second bare cell physically contact each other.

* * * * *

UNITED STATES PATENT AND TRADEMARK OFFICE
CERTIFICATE OF CORRECTION

| | | |
|---|---|---|
| PATENT NO. | : 8,658,294 B2 | Page 1 of 1 |
| APPLICATION NO. | : 12/577607 | |
| DATED | : February 25, 2014 | |
| INVENTOR(S) | : Youngcheol Jang et al. | |

It is certified that error appears in the above-identified patent and that said Letters Patent is hereby corrected as shown below:

In the Claims

Column 9, Claim 11, line 18         After "circuit"
                                    Insert -- module --

Signed and Sealed this
Twelfth Day of January, 2016

Michelle K. Lee
*Director of the United States Patent and Trademark Office*